UNITED STATES PATENT OFFICE.

JOSEPH GALLAND, OF MANSFIELD, OHIO, ASSIGNOR TO THE AULTMAN & TAYLOR COMPANY, OF SAME PLACE.

THRASHING-MACHINE.

SPECIFICATION forming part of Letters Patent No. 411,803, dated October 1, 1889.

Application filed January 7, 1889. Serial No. 295,635. (No model.)

*To all whom it may concern:*

Be it known that I, JOSEPH GALLAND, a citizen of the United States, and a resident of Mansfield, county of Richland, and State of Ohio, have invented a new and useful Improvement in Thrashing-Machines, of which the following is a full, clear, and exact description, reference being had to the accompanying drawings, making part of this specification.

The invention relates to an improvement in a straw cutting and bruising attachment to thrashing-machines, for which Letters Patent were granted October 16, 1888, Serial No. 391,139, and more particularly to the means employed for feeding the straw as it comes from the straw carrier and shaker of the thrashing-machine to the cutting and bruising cylinders, whereby the straw is not only properly guided to but is forced into the straw cutter and bruiser attachment, and will be fully understood from the following description and claims, reference being had to the accompanying drawings, in which—

Figure 1 is a side elevation of the rear end of a thrashing-machine, with the feeder for the straw-cutting attachment thereto shown in section, and with the side casing of the machine partly broken away to show the discharge end of the straw-shaker and the carrier for conveying the straw to the cutting attachment. Fig. 2 is a rear view of said feeder, and Fig. 3 is a front or face view of the same.

The machine in its organization or general construction and arrangement of parts may be similar to that described in my former patent referred to, or to others in common use, and need not, therefore, be described further than is necessary to an understanding of my improvement. The straw, after being operated upon by the thrashing-cylinder and concave, is deposited upon a shaking-carrier, by means of which the grain is separated from it as the straw is carried onward to the rear end of the machine, in the usual manner, where it is discharged, either directly or through a supplemental carrier, as described in my former patent referred to, into the straw cutting and bruising attachment, A' indicating the shaking-carrier, and A³ the supplemental carrier referred to.

A indicates a portion of the frame-work of a thrashing-machine and separator with my improved straw cutting and bruising attachment applied; B, the straw-cutting and C the straw-bruising cylinders thereof, said cylinders being provided with concaves and connected by a drum or apron, (indicated in dotted lines at C',) so that the straw is fed from one to the other in a manner fully described in my former patent referred to.

The concave (indicated at B' of the cutting-cylinder B) is provided at its upper or receiving end with an apron or extension-flap $a$, forming a straw-guide, and secured by straps $a'$ to the machine-frame, and upon which the lower end of the feeder chute-board D rests and slides. The upper end of this chute-board or feeder is provided with two or more perforated lugs or ears $d\ d$, with which cranks $e\ e$ on a transverse shaft E, mounted in suitable bearings in the frame A, are engaged for imparting a reciprocating or rising-and-falling movement to the feeder chute-board D. The shaft E is provided on one end with a band-wheel or pulley E', from which a band may extend to a pulley on any suitable driven shaft of the machine for operating the shaft E.

The board or feeder D is composed, preferably, of a series of upright boards $d'$, of light material, fitted snugly together at the edges and extending the full width of the inside of the machine-frame, for preventing the escape of any straw prior to the action of the cutting and bruising cylinders thereon, said boards being united at their ends to transverse slats or cleats $d^2$ for giving the required strength and rigidity to the feeder; but it may, of course, be made of any suitable material. To the inner face of this board a number of notched or toothed slats or strips $b$ are secured, the teeth $b'$ upon the forward exposed faces of which are made, preferably, saw-tooth-shaped, having inclined outer or upper faces, to permit the straw to pass readily down over them, and having abrupt or square-shouldered lower faces, adapted to engage the straw and to force the same downward in the downward movement of the chute-board or feeder; but any other form of teeth may be employed that will accomplish the same result. The chute-board (No Model.)
T. F. GAYNOR.
BELL STRIKING APPARATUS.
No. 411,804. Patented Oct. 1, 1889.
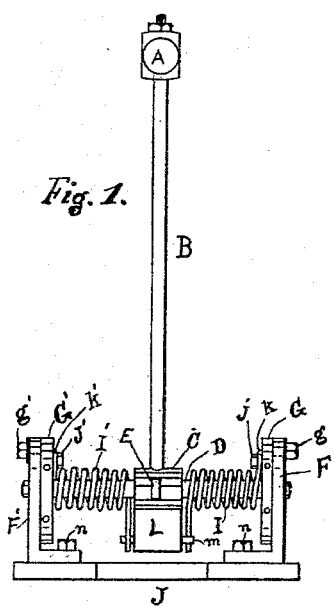
Fig. 1.
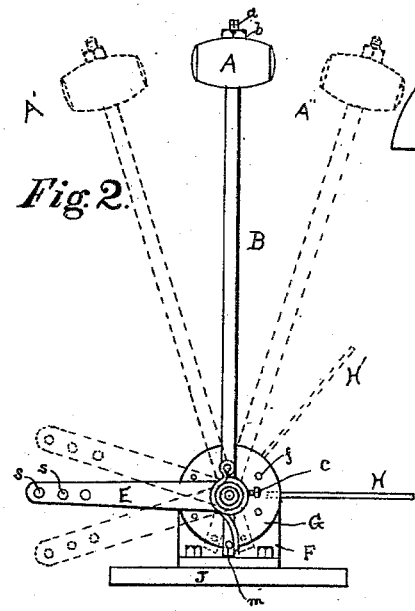
Fig. 2.
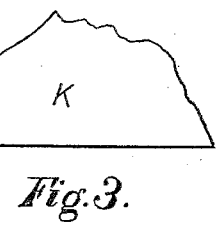
Fig. 3.
Fig. 9. Fig. 10. Fig. 11. Fig. 4. Fig. 5. Fig. 6. Fig. 7.
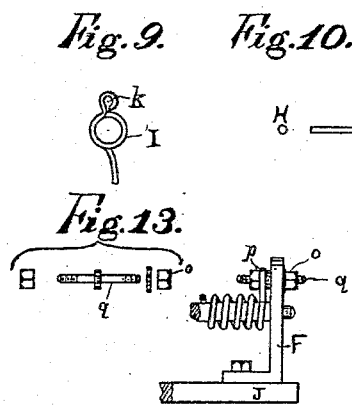
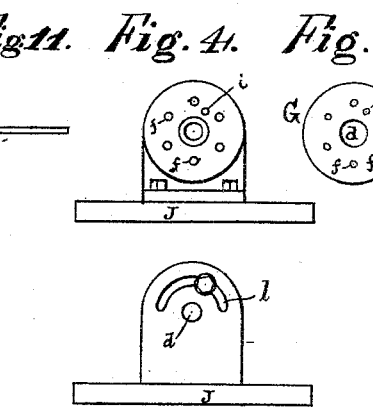
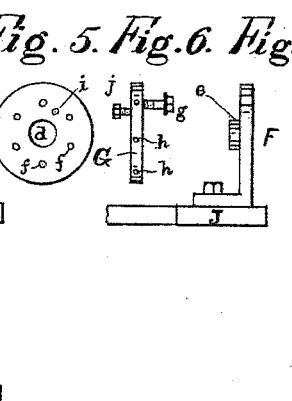
Fig. 13.
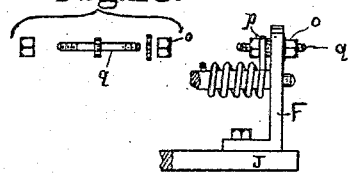
Fig. 12.
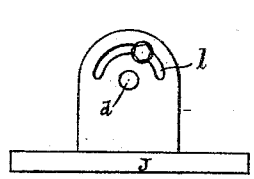
Fig. 8.
WITNESSES.
E. H. STEPHENS.
T. F. O'Brien
INVENTOR.
T. F. Gaynor.